United States Patent
Planque et al.

(10) Patent No.: US 12,334,615 B2
(45) Date of Patent: Jun. 17, 2025

(54) ASSEMBLY COMPRISING A SOEC/SOFC-TYPE SOLID OXIDE CELL STACK AND A CLAMPING SYSTEM HAVING A HOT PLATE

(71) Applicant: COMMISSARIAT A L'ENERGIE ATOMIQUE ET AUX ENERGIES ALTERNATIVES, Paris (FR)

(72) Inventors: Michel Planque, Grenoble (FR); Guilhem Roux, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/693,596

(22) PCT Filed: Sep. 19, 2022

(86) PCT No.: PCT/FR2022/051755
§ 371 (c)(1),
(2) Date: Mar. 20, 2024

(87) PCT Pub. No.: WO2023/047045
PCT Pub. Date: Mar. 30, 2023

(65) Prior Publication Data
US 2025/0118787 A1 Apr. 10, 2025

(30) Foreign Application Priority Data
Sep. 21, 2021 (FR) ........................................ 2109939

(51) Int. Cl.
*H01M 8/248* (2016.01)
*C25B 9/05* (2021.01)
(Continued)

(52) U.S. Cl.
CPC ............... *H01M 8/248* (2013.01); *C25B 9/05* (2021.01); *C25B 9/67* (2021.01); *C25B 9/77* (2021.01);
(Continued)

(58) Field of Classification Search
CPC ............ H01M 8/248; H01M 8/04067; H01M 8/0432; H01M 8/2432; H01M 2008/1293
See application file for complete search history.

(56) References Cited

U.S. PATENT DOCUMENTS

| 6,649,293 B1 | 11/2003 | Jones |
| 2020/0313217 A1* | 10/2020 | Planque ............ H01M 8/04074 |

FOREIGN PATENT DOCUMENTS

| EP | 3835455 A1 | 6/2021 |
| FR | 3045215 A1 | 6/2017 |

(Continued)

OTHER PUBLICATIONS

Search Report for International Application No. PCT/FR2022/051755 dated Jan. 20, 2023.
(Continued)

*Primary Examiner* — Stewart A Fraser
(74) *Attorney, Agent, or Firm* — McDonald Hopkins LLC

(57) ABSTRACT

An assembly including a stack of solid oxide cells of the SOEC/SOFC type and a clamping system for the stack. This assembly furthermore includes at least one heating plate, demountable and interchangeable, inserted in a housing of at least one of the top and bottom clamping plates, the housing being formed in the thickness of the at least one of the top and bottom clamping plates, and comprising first and second opposite ends, at least one of which emerges on the lateral face-of the at least one of the top and bottom clamping plates, being located inside, at a distance from its main top and bottom faces substantially parallel to each other.

14 Claims, 4 Drawing Sheets

(51) Int. Cl.
  *C25B 9/67* (2021.01)
  *C25B 9/77* (2021.01)
  *C25B 15/023* (2021.01)
  *H01M 8/04007* (2016.01)
  *H01M 8/0432* (2016.01)
  *H01M 8/12* (2016.01)
  *H01M 8/2432* (2016.01)

(52) U.S. Cl.
  CPC ....... *C25B 15/023* (2021.01); *H01M 8/04067* (2013.01); *H01M 8/0432* (2013.01); *H01M 8/2432* (2016.02); *H01M 2008/1293* (2013.01)

(56) References Cited

FOREIGN PATENT DOCUMENTS

| | | |
|---|---|---|
| FR | 3075481 A1 | 6/2019 |
| FR | 3087952 A1 | 5/2020 |
| WO | 2016085360 A1 | 6/2016 |
| WO | 2019081866 A1 | 5/2019 |
| WO | 2020084258 A1 | 4/2020 |

OTHER PUBLICATIONS

Written Opinion in International Application No. PCT/FR2022/051755 dated Jan. 20, 2023.

\* cited by examiner

US 12,334,615 B2

ASSEMBLY COMPRISING A SOEC/SOFC-TYPE SOLID OXIDE CELL STACK AND A CLAMPING SYSTEM HAVING A HOT PLATE

CROSS-REFERENCE TO RELATED APPLICATIONS

This is a National Stage application of PCT international application PCT/FR2022/051755, filed on Sep. 19, 2022, which claims the priority of French Patent Application No. 2109939, filed Sep. 21, 2021, both of which are incorporated herein by reference in their entirety.

TECHNICAL FIELD

The present invention relates to the general field of high-temperature electrolysis (HTE), in particular high-temperature steam electrolysis (HTSE), respectively designated by the English terms "High Temperature Electrolysis" (HTE) and "High Temperature Steam Electrolysis" (HTSE), carbon dioxide ($CO_2$) electrolysis, or even high-temperature steam and carbon dioxide ($CO_2$) co-electrolysis.

More precisely, the invention relates to the field of high-temperature solid-oxide electrolyzers, normally designated by the acronym SOEC (standing for "Solid Oxide Electrolysis Cell" in English).

It also relates to the field of high-temperature solid-oxide fuel cells, normally designated by the acronym SOFC (standing for "Solid Oxide Fuel Cells" in English).

Thus, more generally, the invention refers to the field of solid-oxide stacks of the SOEC/SOFC type operating at high temperature.

More precisely, the invention relates to an assembly comprising a stack of solid oxide cells of the SOEC/SOFC type and a clamping system comprising at least one removable and interchangeable heating plate, as well as an associated manufacturing method.

PRIOR ART

In the context of a high-temperature solid-oxide electrolyzer of the SOEC type, it is a case of transforming, by means of an electric current, in one and the same electrochemical device, steam ($H_2O$) into dihydrogen ($H_2$) and dioxygen ($O_2$), and/or transforming carbon dioxide ($CO_2$) into carbon monoxide (CO) and dioxygen ($O_2$). In the context of a high-temperature solid-oxide fuel cell of the SOFC type, the operation is the reverse, to produce an electric current and heat while being supplied with dihydrogen ($H_2$) or other fuels such as methane ($CH_4$), natural gas or biogas, and with dioxygen ($O_2$), typically with air. For reasons of simplicity, the following description privileges the operation of a high-temperature solid-oxide electrolyzer of the SOEC type implementing electrolysis of steam. However, this operation is applicable to the electrolysis of carbon dioxide ($CO_2$), or even the co-electrolysis of high-temperature steam with carbon dioxide ($CO_2$). In addition, this operation is transposable to the case of a high-temperature solid-oxide fuel cell of the SOFC type.

To implement electrolysis of water, is advantageous to implement it at high-temperature, typically between 60° and 1000° C., since it is more advantageous to electrolyze steam than liquid water and because some of the energy necessary for the reaction can be provided by heat, which is less expensive than electricity.

To implement high-temperature steam electrolysis (HTSE), a high-temperature solid-oxide electrolyzer of the SOEC type consists of a stack of elementary patterns each including a solid-oxide electrolysis cell, or electrochemical cell, consisting of three anode/electrolyte/cathode layers superimposed on one another, and interconnection plates made from metal alloys, also referred to as bipolar plates or interconnectors. Each electrochemical cell is gripped between two interconnection plates. A high-temperature solid-oxide electrolyzer of the SOEC type is then an alternating stack of electrochemical cells and interconnectors. A high-temperature solid-oxide fuel cell of the SOFC type consists of the same type of stack of elementary patterns. Since this high-temperature technology is reversible, the same stack can operate in electrolysis mode and produce hydrogen and oxygen from water and electricity, or in fuel-cell mode and produce electricity from hydrogen and oxygen.

Each electrochemical cell corresponds to an electrolyte/electrode assembly, which is typically a multilayer assembly made from ceramic, the electrolyte of which is formed by an ion-conducting central layer, this layer being solid, dense, and impervious, and gripped between the two porous layers forming the electrodes. It should be noted that additional layers may exist, but which serve only to improve one or more of the layers already described.

The interconnection devices, electrical and fluidic, are electron conductors which, from an electrical point of view, provide the connection of each electrochemical cell of an elementary pattern in the stack of elementary patterns, guaranteeing electrical contact between one face and the cathode of a cell and between the other face and the anode of the following cell and, from a fluidic point of view, the supply of reagents and the discharge of products for each of the cells. The interconnectors thus fulfil the functions of bringing and collecting electric current and delimiting the gas-circulation compartments, for distribution and/or collection.

More precisely, the main function of the interconnectors is to provide passage of the electric current but also circulation of the gases in the vicinity of each cell (namely: injected steam and extracted hydrogen and oxygen for the EHT electrolysis; air and fuel, including injected hydrogen and extracted water for an SOFC cell), and to separate the anode and cathode compartments of two adjacent cells, which are the compartments for circulation of the gases on the respectively anode and cathode sides of the cells.

In particular, for a high-temperature solid-oxide electrolyzer of the SOEC type, the cathode compartment includes steam and hydrogen, products of the electrochemical reaction, while the anode compartment includes a purge gas, if present, and oxygen, another product of the electrochemical reaction. For a high-temperature solid-oxide fuel cell of the SOFC type, the anode compartment includes oxidant, while the cathode compartment includes fuel.

To implement high-temperature steam electrolysis (HTSE), steam ($H_2O$) is injected into the cathode compartment. Under the effect of the electric current applied to the cell, dissociation of the water molecules in the form of steam is implemented at the interface between the hydrogen electrode (cathode) and the electrolyte: this dissociation produces dihydrogen gas ($H_2$) and oxygen ions ($O^{2-}$). The dihydrogen ($H_2$) is collected and discharged at the outlet of the hydrogen compartment. The oxygen ions ($O^{2-}$) migrate through the electrolyte and recombine as dioxygen ($O_2$) at the interface between the electrolyte and the oxygen electrode (anode). A purge gas, such as air, can circulate at the anode and thus collect the oxygen generated in gaseous form at the anode.

To operate a solid-oxide fuel cell (SOFC), air (oxygen) is injected into the cathode compartment of the cell and hydrogen into the anode compartment. The oxygen of the air will dissociate into $O^{2-}$ ions. These ions will migrate in the electrolyte of the cathode to the anode to oxidize the hydrogen and form water with a simultaneous production of electricity. In an SOFC cell, just like in SOEC electrolysis, the steam is in the dihydrogen ($H_2$) compartment. Only the polarity is reversed.

By way of illustration, FIG. 1 is a schematic view showing the principle of operation of a high-temperature solid-oxide electrolyzer of the SOEC type. The function of such an electrolyzer is to transform steam into hydrogen and oxygen in accordance with the following electrochemical reaction:

$$2H_2O \rightarrow 2H_2 + O_2.$$

This reaction is implemented electrochemically in the cells of the electrolyzer. As shown schematically on FIG. 1, each elementary electrolysis cell 1 is formed by a cathode 2 and an anode 4, placed on either side of a solid electrolyte 3. The two electrodes (cathode and anode) 2 and 4 are electron and/or ion conductors, made from porous material, and the electrolyte 3 is gastight, electron-insulating and ion-conductive. The electrolyte 3 can in particular be an anionic conductor, or more precisely an anionic conductor of $O^2$-ions, and the electrolyzer is then referred to as an ionic electrolyzer, in contradistinction to protonic electrolytes ($H^+$).

The electrochemical reactions take place at the interface between each of the electron conductors and the anionic conductor.

At the cathode 2, the half-reaction is as follows:

$$2H_2O + 4e \rightarrow 2H_2 + 2O^{2-}.$$

At the anode 4, the half-reaction is as follows:

$$2O^{2-} \rightarrow O_2 + 4e.$$

The electrolyte 3, interposed between the two electrodes 2 and 4, is the site of migration of the $O^2$-ions under the effect of the electrical field created by the difference in potential imposed between the anode 4 and the cathode 2.

As illustrated between parentheses on FIG. 1, the steam at the cathode inlet may be accompanied by hydrogen $H_2$, and the hydrogen produced and recovered at the outlet may be accompanied by steam. Likewise, as illustrated in broken lines, a purge gas, such as air, may furthermore be injected at the inlet on the anode side to discharge the oxygen produced. An additional function of injecting a purge gas is to fulfil the role of heat regulator.

An elementary electrolyzer, or electrolysis reactor, consists of an elementary cell as described above, with a cathode 2, an electrolyte 3, and an anode 4, and two interconnectors that fulfill the functions of electrical and fluidic distribution.

To increase the flow rates of hydrogen and oxygen produced, stacking a plurality of elementary electrolysis cells on top of one another, separating them by interconnectors, is known. The assembly is positioned between two end interconnection plates that support the electrical supplies and the gas supplies of the electrolyzer (electrolysis reactor).

A high-temperature solid-oxide electrolyzer of the SOEC type thus comprises at least one, and generally a plurality of electrolysis cells stacked one on top of the other, each elementary cell being formed by an electrolyte, a cathode, and an anode, the electrolyte being interposed between the anode and the cathode.

As indicated previously, the fluidic and electrical interconnection devices that are in electrical contact with one or more electrodes in general fulfill the functions of bringing and collecting electric current and delimit one or more gas-circulation compartments.

Thus the function of the so-called cathode compartment is the distribution of the electric current and steam and recovery of the hydrogen at the cathode in contact.

The function of the so-called anode compartment is the distribution of the electrical current and recovery of the oxygen produced at the anode in contact, optionally by means of a purge gas.

FIG. 2 shows an exploded view of elementary patterns of a high-temperature solid-oxide electrolyzer of the SOEC type according to the prior art. This electrolyzer includes a plurality of elementary electrolysis cells C1, C2, of the solid-oxide cell (SOEC) type, stacked in alternation with interconnectors 5. Each cell C1, C2 consists of a cathode 2.1, 2.2 and an anode (only the anode 4.2 of the cell C2 is shown), between which an electrolyte is disposed (only the electrolyte 3.2 of the cell C2 is shown).

The interconnector 5 is a component made from metal alloy that provides the separation between the cathode 50 and anode 51 compartments, defined by the volumes comprised between the interconnector 5 and the adjacent cathode 2.1 and between the interconnector 5 and the adjacent anode 4.2 respectively. It also provides distribution of the gases to the cells. The injection of steam into each elementary pattern takes place in the cathode compartment 50. The hydrogen produced and residual steam at the cathode 2.1, 2.2 is collected in the cathode compartment 50 downstream of the cell C1, C2 after dissociation of the steam by it. The oxygen produced at the anode 4.2 is collected in the anode compartment 51 downstream of the cell C1, C2 after dissociation of the steam by it. The interconnector 5 provides passage of the current between the cells C1 and C2 by direct contact with the adjacent electrodes, i.e. between the anode 4.2 and the cathode 2.1.

The operating conditions of a high-temperature solid-oxide electrolyzer (SOEC) being very similar to those of a solid-oxide fuel cell (SOFC), the same technological constraints found.

Thus the correct operation of such solid-oxide stacks of the SOEC/SOFC type operating at high temperature mainly requires satisfying the points stated below.

First of all, it is necessary to have electrical insulation between two successive interconnectors, otherwise the electrochemical cell would short-circuit, but also good electrical contact and sufficient contact surface between a cell and an interconnector. The lowest possible ohmic resistance is sought between cells and interconnectors.

Moreover, it is necessary to have gas tightness between the anode and cathode compartments, otherwise there would be recombination of the gases produced, causing a drop in efficiency and especially the appearance of hot spots damaging the stack.

Finally, it is essential to have good distribution of the gases both at the input and in recovery of the products, otherwise there would be loss of efficiency, non-homogeneities of pressure and of temperature in the various elementary patterns, or even unacceptable degradations of the electrochemical cells.

Conventionally, the incoming and outgoing gases in a high-temperature electrolysis (SOEC) or fuel cell (SOFC)

stack operating at high temperature can be managed by means of devices such as the one illustrated with reference to FIG. 3. The device 13 thus includes cold parts PF and hot parts PC, the latter comprising the furnace floor 11, the furnace bell 10, a loop tube 12 for managing the gas entries and exits, and the high-temperature electrolysis (SOEC) or fuel cell (SOFC) stack 20, From the French patent application FR 3 045 215 A1, a principle is known of a self-contained clamping system for a stack of the SOEC/SOFC type to make it self-contained and to confer on it the character of the "Plug & Play" (PnP) type. Such a stack concept, having demountable integrated heating elements, for example of the electrical element type, makes it possible both to apply force to the manufacture of the stack, to maintain the same force, including in operation at high-temperature, and to supply heat necessary for operation thereof as close as possible to the stack. This PnP system with integrated heating units allows rapid installation of the stack in a so-called "hot-box" system, then consisting solely of a compact insulated chamber, and operation thereof without having to manage clamping thereof in operation at high temperature, despite the differential expansions of the various components, and improvement of the thermal efficiency of the system and consequently the performances thereof. This also makes it possible to gain in compactness in the heating zone, since a resistive furnace is no longer necessary.

With reference to FIG. 4, an example of an assembly 80 has thus been illustrated, comprising a solid-oxide stack 20 of the SOEC/SOFC type and a clamping system 60. This stack 20 includes a plurality of electrochemical cells 41 each formed by a cathode, an anode, and an electrolyte interposed between the cathode and the anode, and a plurality of intermediate interconnectors 42 each arranged between two adjacent electrochemical cells 41. This assembly of electrochemical cells 41 and of intermediate interconnectors 42 is also referred to as a stack.

In addition, the stack 20 includes a top end plate 43 and a bottom end plate 44, respectively also referred to as top stack end plate 43 and bottom stack end plate 44, between which the plurality of electrochemical cells 41 and the plurality of intermediate interconnectors 42 are clamped, i.e. between which the stack is located.

Moreover, the assembly 80 also includes a system 60 for clamping the solid-oxide stack 20 of the SOEC/SOFC type, including a top clamping plate 45 and a bottom clamping plate 46, between which the solid-oxide stack 20 of the SOEC/SOFC type is clamped. Each clamping plate 45, 46 of the clamping system 60 includes four clamping orifices 54.

In addition, the clamping system 60 furthermore includes four clamping rods 55, or tie rods, extending through a clamping orifice 54 of the top clamping plate 45 and through a corresponding clamping orifice 54 of the bottom clamping plate 46 to enable the top 45 and bottom 46 clamping plates to be assembled together.

The clamping system 60 also includes clamping means 56, 57, 58 at each clamping orifice 54 of the top 45 and bottom 46 clamping plates cooperating with the clamping rods 55 to enable the top 45 and bottom 46 clamping plates to be assembled together.

More precisely, the clamping means include, at each clamping orifice 54 of the top clamping plate 45, a first clamping nut 56 cooperating with the corresponding clamping rod 55 inserted through the clamping orifice 54. In addition, the clamping means include, at each clamping orifice 54 of the top clamping plate 46, a second clamping nut 57 associated with a clamping washer 58, the latter cooperating with the corresponding clamping rod 55 inserted through the clamping orifice 54. The clamping washer 58 is located between the second clamping nut 57 and the bottom clamping plate 46.

Moreover, from the French patent application FR 3 087 952 A1, a principle of integration of heating elements with the top and bottom plates of a self-contained clamping system of a stack of the PnP type is also known, in particular as described above. Thus heating elements of the heating wire type are integrated in the two top and bottom clamping plates, of the order of 30 mm thick, made from refractory austenitic steel, of the AISI 310 type, by machining and brazing.

The heating elements integrated in the dense metal components in direct contact with the stack thus greatly improve losses by heat transfer, which then takes place by conduction without disturbance and uniformly over the contact zones. This affords excellent thermal homogeneity between the top and bottom plates, and by extension good overall homogeneity of the stack, and increased reactivity of the heating elements to the temperature setting fixed for the electrolyzer. In this way better thermal management of the whole of the system is obtained. Since the heating is integrated, the insulation can be modulated to the forms of the stack, further limiting radiation to the outside. Such efficacy of thermal transfer of the heating elements then makes it possible to reduce the power to be supplied to the system by a minimum of 100 W to operate at temperatures of the order of 600 to 1000° C. The temperature measured in the insulated chamber follows a ramp rise almost identical to that of the plates, which is also very good sign for thermal control of the hotbox.

However, one of the problems with this technology lies in the fact that, if a heating element were to malfunction, there is no margin for maneuver. Thermal management of the stack is then lost, without any possibility of recovery. Furthermore, the cost of producing these heating elements, in particular in the form of elements brazed on the clamping plates, is very high and therefore constraining.

There is thus still a need for improving the integration of heating units in a high-temperature electrolysis (SOEC) or fuel-cell (SOFC) stack while allowing operation at high temperature, in particular between 600 and 1000° C.

DESCRIPTION OF THE INVENTION

The aim of the invention is to at least partially remedy the requirements mentioned above and the drawbacks relating to the embodiments of the prior art.

The object of the invention is thus, according to one of the aspects thereof, an assembly including:
- a stack of solid-oxide cells of the SOEC/SOFC type operating at high temperature, including:
  - a plurality of electrochemical cells each formed by a cathode, an anode, and an electrolyte interposed between the cathode and the anode, and a plurality of intermediate interconnectors each arranged between two adjacent electrochemical cells,
  - a system for clamping the stack of solid-oxide cells of the SOEC/SOFC type, including a top clamping plate and a bottom clamping plate, between which the stack of solid-oxide cells of the SOEC/SOFC type is clamped, each clamping plate including at least two clamping orifices, the clamping system further including:
    - at least two clamping rods intended to each extend through a clamping orifice of the top clamping plate and through a corresponding clamping orifice of the bottom clamping plate to enable the top and bottom clamping plates to be assembled together, clamping means at each clamping orifice of the top and bottom clamping plates intended to cooperate with said at least two clamping rods to enable the top and bottom clamping plates to be assembled together, characterized in that at least one of the top and bottom clamping plates includes a housing, formed in the thickness of said at least one of the top and bottom clamping plates, comprising first and second opposite ends, at least one of which emerges on the lateral face of said at least one of the top and bottom clamping plates, said housing being located inside said at least one of the top and bottom clamping plates, at a distance from its main top and bottom faces substantially parallel to each other, and in that the assembly includes at least one heating plate, demountable and interchangeable, inserted in said housing.

By virtue of the invention, it can be possible to keep the interests associated with the integration of heating elements in the thick clamping plates, which improves the thermal efficiency of the stack of the SOEC/SOFC type while minimizing losses of heat and keeping the same sizing of the elements of the self-contained clamping system described above. In addition, the principle of the invention makes it possible to make the heating element or elements demountable and interchangeable, in particular in the case of malfunctioning thereof.

The assembly according to the invention can furthermore include one or more of the following features taken in isolation or in accordance with all technically possible combinations.

Said housing and said at least one heating plate can have a substantially parallelepipedal shape, in particular a slab shape or a cubic shape.

Moreover, said housing can be formed, in the thickness of said at least one of the top and bottom clamping plates, centrally, at equal distances from the main top and bottom faces, and at equal distances from the clamping orifices, between the clamping orifices.

In addition, the thickness of said housing can be between 5 mm and 10 mm, in particular of the order of 8 mm. The width of said housing can for its part be between 20 mm and 86 mm, in particular of the order of 86 mm.

Furthermore, said at least one heating plate can include a heating element the maximum power of which is at least 1200 W.

Said at least one heating plate can be produced from ceramic or from metal alloy, in particular from stainless steel or from nickel-based alloy, being in particular treated by an aluminizing coating.

In addition, a clearance can be present between the external surface of said at least one heating plate and the internal surface of said housing, the dimension of which can be between 0.2 and 0.5 mm.

Moreover, said at least one of the top and bottom clamping plates can include at least one internal groove formed in the thickness of said at least one of the top and bottom clamping plates, and extending substantially parallel to the top and bottom faces thereof, and at least one end of which emerges on the lateral face of said at least one of the top and bottom clamping plates. The assembly can then include at least one thermocouple device inserted in said at least one internal groove.

In particular, said at least one internal groove can include a first safety internal groove and a second regulation internal groove. Said at least one thermocouple device can include a first safety thermocouple device inserted in the first internal groove and a second regulation thermocouple device inserted in the second internal groove.

Moreover, the assembly can include a top end plate and a bottom end plate, between which the plurality of electrochemical cells and the plurality of intermediate interconnectors are clamped.

In addition, said at least one of the top and bottom clamping plates can advantageously be manufactured by an additive manufacturing technique, being in particular produced from refractory austenitic steel, in particular of the AISI 310 type.

Furthermore, said at least one of the top and bottom clamping plates can have a thickness of between 20 and 30 mm, in particular of the order of 25 mm.

In addition, another object of the invention, according to another of the aspects thereof, is a system characterized in that it includes:

an assembly as defined above, a device, to which at least one gas inlet and/or outlet tube is connected, and to which the stack of solid-oxide cells of the SOEC/SOFC type operating at high temperature is coupled for the entry and discharge of the gases.

Moreover, another object of the invention, according to another of the aspects thereof, is a method for manufacturing an assembly as defined above, characterized in that it includes the step of producing said housing in said at least one of the top and bottom clamping plates.

The step of producing said housing can for example include production by electroerosion, by hubbing, and/or by additive manufacturing.

BRIEF DESCRIPTION OF THE DRAWINGS

The invention can be best understood from the reading of the following detailed description of non-limitative examples of implementation thereof, as well as from the examination of the schematic partial figures of the accompanying drawing, on which.

In all these figures, identical references can designate identical or analogous elements.

In addition, the various parts shown on the figures are not necessarily shown to a uniform scale, to make the figures more legible.

Detailed Description of Particular Embodiments

FIGS. 1 to 4 have already been described previously in the part relating to the prior art and to the technical context of the invention. It is stated that, for FIGS. 1 and 2, the symbols and the arrows for supply of steam $H_2O$, for distribution and recovery of dihydrogen $H_2$, oxygen $O_2$, air, and electrical current are shown for purposes of clarity and precision, to illustrate the operation of the devices shown.

Furthermore, it must be noted that all the constituents (anode/electrolyte/cathode) of a given electrochemical cell are preferentially ceramics. The operating temperature of a stack of the high-temperature SOEC/SOFC type is moreover typically between 60° and 1000° C.

In addition, any terms "top" and "bottom" are to be understood here in the normal direction of orientation of a stack of the SOEC/SOFC type when in its use configuration.

Figure 1:
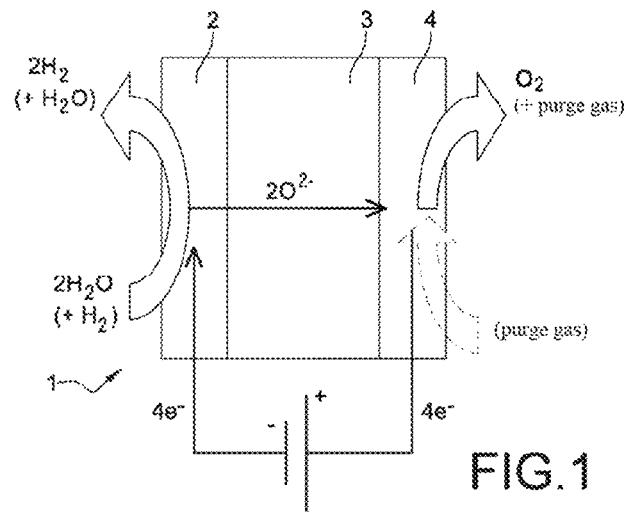
FIG. 1 is a schematic view showing the principle of operation of a high-temperature solid-oxide electrolyzer (SOEC)
Figure 2:
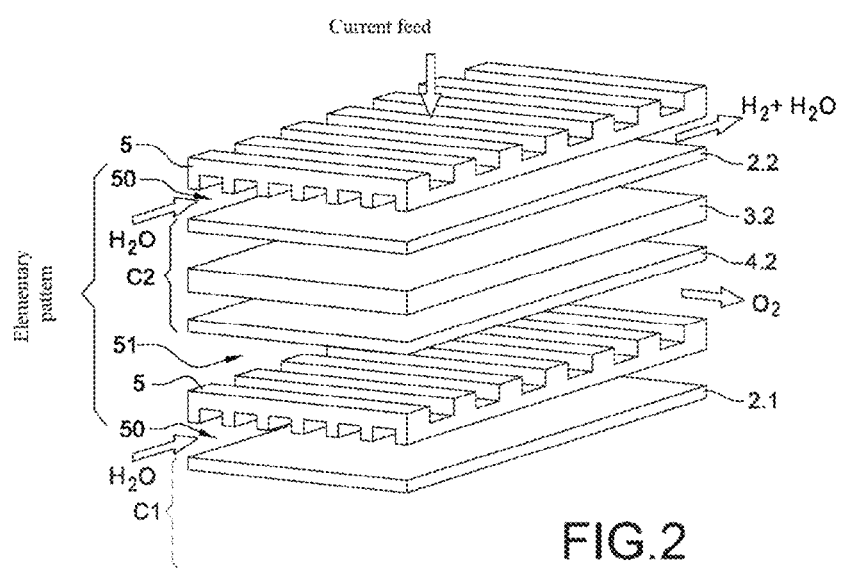
FIG. 2 is an exploded schematic view of a part of a high-temperature solid-oxide electrolyzer (SOEC) comprising interconnectors according to the prior art.
Figure 3:
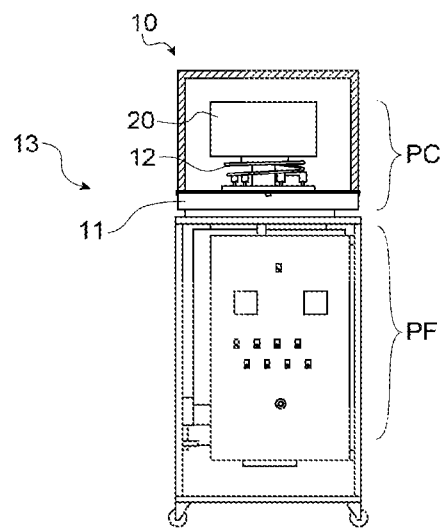
FIG. 3 illustrates the principle of the architecture of a device on which a high-temperature electrolysis (SOEC) or fuel-cell (SOFC) stack operating at high temperature is placed.
Figure 4:
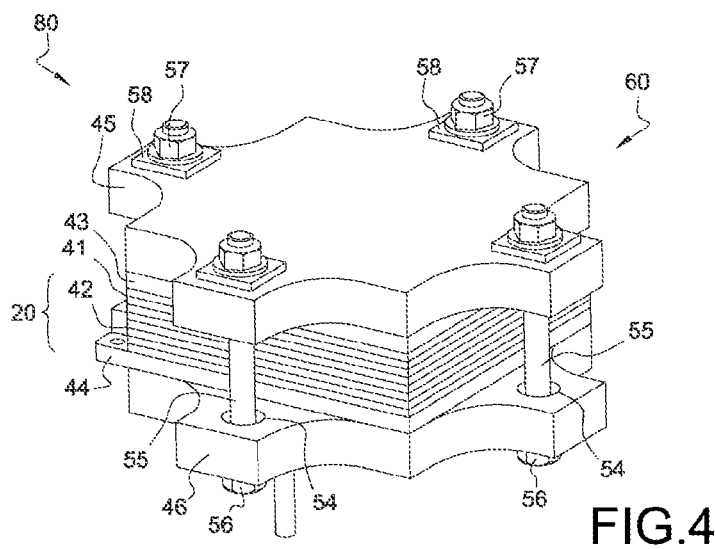
FIG. 4 shows, in perspective and by observation from above, an example of an assembly comprising a stack of solid oxide cells of the SOEC/SOFC type and a clamping system for the stack.
Figure 5:
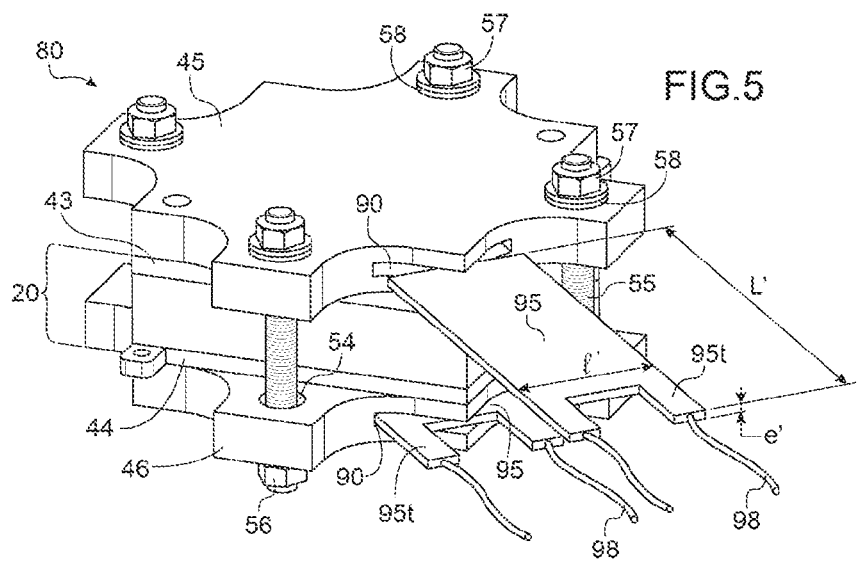
FIG. 5 shows, in perspective and by observation from above, an example of an assembly according to the invention comprising a stack of solid oxide cells of the SOEC/SOFC type, a clamping system for the stack, and two heating plates inserted in corresponding housings formed in the clamping plates.
Figure 6:
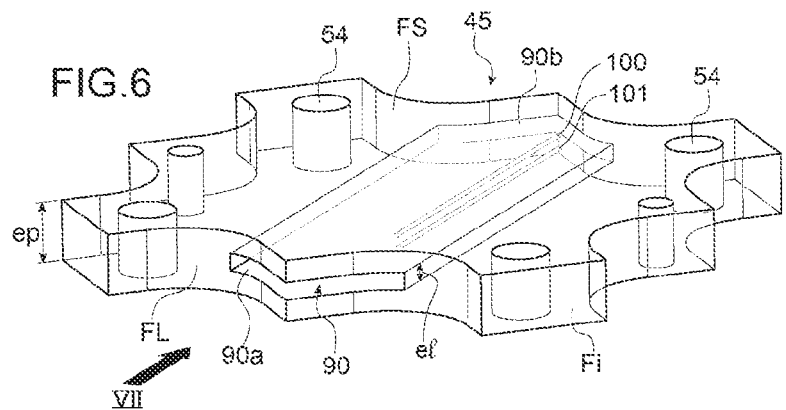
FIG. 6 shows, in a perspective view and by observation from above and in transparency, a top clamping plate of an assembly according to the invention, shown in isolation.
Figure 7:
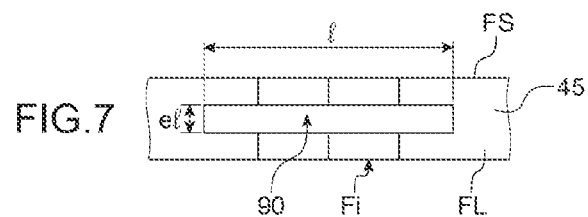
FIG. 7 is a lateral partial view along VII of [FIG. 6]
Figure 8:
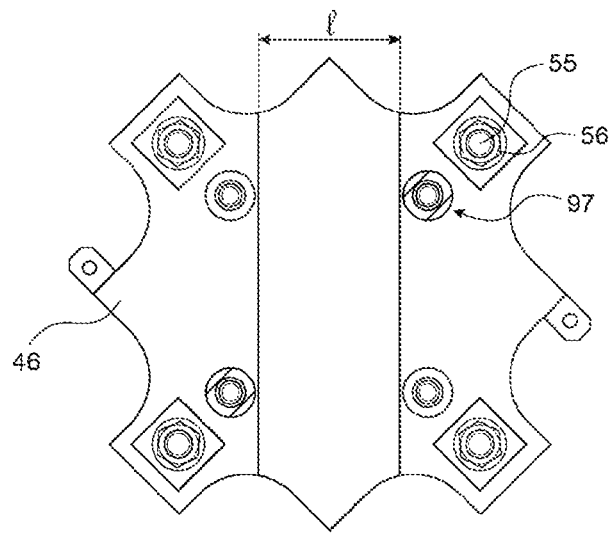
FIG. 8 shows, by observation from below, a bottom clamping plate of an assembly according to the invention, such as the one in [FIG. 5]

FIGS. 5 to 9 relate to an example embodiment of an assembly 80 according to the invention. In particular, FIG. 5 shows an example of an assembly 80 according to the invention similar to the one described previously with reference to FIG. 4. Thus the elements common to FIGS. 4 to 5 will not be described again.

In accordance with the invention, each top 45 and bottom 46 clamping plate includes a housing 90. The features of such housings 90 are best visible with reference to FIGS. 6 to 8.

Each housing 90 is formed in the thickness ep of each top 45 and bottom 46 clamping plate. It includes a first end 90a and a second end 90b, opposite to each other, which both emerge on the lateral face FL of each clamping plate 45, 46.

The housing 90 is formed inside the corresponding clamping plate 45, 46, passing through it on a longitudinal axis while passing through the middle of the plate. It is therefore centered inside the clamping plate 45, 46. In particular, as can be seen on FIG. 6 relating to the top clamping plate 45, the housing 90 is formed at equal distances from the clamping orifices 54, between them. Likewise, as can be seen on FIG. 8 relating to the bottom clamping plate 46, the housing 90 is formed at equal distances from the passage holes 97 for entry and/or exit of the gases. Each housing 90 is thus intended to receive a heating plate 95, as can be seen on FIG. 5. Each heating plate 95 is supplied by means of supply wires 98 visible on FIG. 5. The positioning of the heating plates 95 provided with such electrical feeds in the form of cables 98 can be done so that they are located to the outside of the side causing the least interference.

Each housing 90 and each heating plate 95 is favorably in a substantially parallelepipedal shape, and in particular here a shape substantially of a slab, but could also be a cubic shape, or even another shape.

Advantageously, the invention therefore allows the use of demountable and interchangeable heating plates. Thus, in the case of damage to a heating plate, it can easily be replaced.

The dimensions of the housing 90 and of the heating plate 95 can vary according to the various requirements and in particular according to the nature of the heating plates used.

Generally, the thickness $e_i$ of the housing 90 is between 5 mm and 10 mm, being here for example of the order of 8 mm, and the width I of the housing 90 is between 20 mm and 86 mm, being for example here of the order of 86 mm.

Moreover, the thickness e' of the heating plate 95 is between 5 mm and 10 mm, being here for example of the order of 5 mm, the width l' of the heating plate 95, in particular of the heating surface thereof, is between 20 mm and 86 mm, being for example here of the order of 84 mm, and the length L' of the heating plate 95, in particular the heating surface thereof, is between 210 mm and 220 mm, being for example here of the order of 260 mm.

The housings 90, or openings, formed in the top 45 and bottom 46 clamping plates can be produced in various ways. In particular, they can be obtained by electroerosion method, by hubbing (or EDM, standing for "electrical discharge machining" in English), and/or by additive manufacturing method, comprising in particular 3D printing.

Firstly, electroerosion by hubbing is a machining method that consists in removing material in a part using electrical discharges. Spark machining is also spoken of. This technique is characterized by its suitability for machining all electrically conductive materials, such as metals, alloys, carbides, graphites, etc, whatever the hardness thereof. This machining method consists in passing a current through a dielectric, in order to generate a vapor or void bubble that ionizes and is resorbed on imploding, causing destruction of the material. This destruction, a microimplosion, causes the spark. The high-intensity current ionizes a channel through the dielectric. A disruptive discharge then occurs, from the electrode towards the part to be machined, damaging the latter very locally, of the order of a few $\mu m^2$. The dielectric then cools the damaged particles, which fall into the tray of the machine in the form of a sludge (microparticles of material and dielectric).

Secondly, additive manufacturing technology makes it possible, using a digital file model and by means of a machine using a method such as extrusion or solidification of metal, polymer, and polymer-thread powder, to create an object step by step. "Layer by layer" printing is spoken of. 3D printing amounts to a deposition of material by melting, selective filtering by means of an energy source (laser, heating elements, electron beams, or ultraviolet light) that makes it possible to assemble the object, and finally solidification of material during the cooling period, except in the case of stereolithography, where a chemical phenomenon of polymerization on photocrosslinkable resins occurs. The machine sequentially prints each layer, one above the other, thus constructing a real object inside the construction chamber of the machine. Once the 3D printer finishes the last layer, a short drying cycle commences. Then the real object can be removed, and potentially undergo finishing treatment if necessary, such as rubbing down, curing for hardness, etc. Manufacturing therefore no longer consists of subtracting material, as traditional techniques do with rolling or machining, but on the contrary adding layer by layer in order to obtain the imagined final object in the required material.

Moreover, in order to be able to operate in the temperature ranges expected for a stack of solid-oxide cells of the SOFC/COEC type, the heating plates 95 include heating elements the maximum power of which is at least 1200 W. Thus they can achieve a power of approximately 1200 W±10% at 230 V, which corresponds to a maximum temperature of the hot zone of 1000° C. with good insulation and adapted regulation, thus making it possible to cover the power dissipated by the insulated chamber. The heating plates 95 can be obtained commercially, in particular through companies specializing in high temperatures.

The heating plates can preferentially be produced from ceramic. Various dimensions and sizes can be produced. Such heating plates can have a hot zone with an operating range up to 1000° C. and a cold zone in the contact zone at 600° C., able to be protected by a sheath made from ceramic wool. However, large heating plates can be manufactured without a cold zone. The special properties and the low mass of the ceramic material can allow rapid heating speeds, uniform distribution of the temperature and precision of control. The high emissivity and the wide emission spectrum of the thermal radiation can make ceramic material obtained from silicon nitride an ideal radiant heating element. A power of 15 W/cm$^2$ at 1000° C. can be achieved.

The heating plates can also be produced from metal alloy. For example, they can be produced from stainless steel, for example from 316L stainless steel, or from nickel-based alloy, in particular from Inconel®, for example from Inconel® 600. In this case, they are advantageously treated with an aluminizing coating on their surfaces in order not to weld to any surfaces with which they might be in contact.

In addition, the heating plates can consist of heating cables, in particular composed of a heating core with mineral insulator, for example of the magnesium oxide (MgO) type at 96-99%, under a sheath of Inconel® 600 and with incorporated cold terminations, illustrated by the reference 95t on FIG. 5. The heating core may have a diameter of between 1 and 2 mm at ±0.05 mm over a given length.

Figure 9:
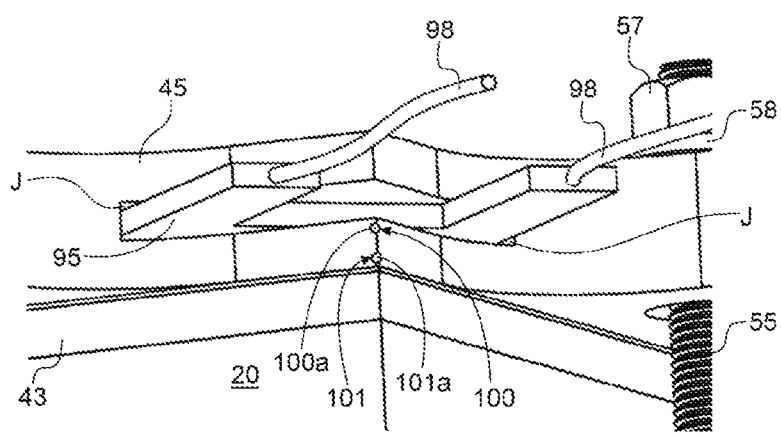
FIG. 9 is a lateral partial view in perspective of the assembly according to the invention in [FIG. 5].

Moreover, as can be seen on FIG. 9, it should be noted that a clearance J is present between the external surface of the heating plate 95 and the internal surface of the housing 90. This clearance J can in particular have a dimension of between 0.2 and 0.5 mm.

When the heating plate 95 is inserted in its housing 90, it can be coated with thermal grease, which will have the effect of filling in the clearance J and achieving a good heat transfer.

Each heating plate 45, 46 is for example here made from refractory material of the 310s stainless steel type. Its coefficient of thermal expansion at 850° C. is for example 18.2 (in $10^{-6} \cdot K^{-1}$), which gives a movement of 0.012 mm at a width I of 86 mm of the housing 90. It should be noted that the expansion of silicon nitride (ceramic) is negligible at a width of 86 mm.

Table 1 below presents data of interest for ceramic materials that can be used for manufacturing the heating plates 95, and in particular the coefficients of thermal expansion.

TABLE 1

| Ceramic | Coefficient of linear thermal expansion 25-1000° C. ($10^{-6} \cdot K^{-1}$) | Thermal conductivity (W/m · K) | Maximum temperature of use (° C.) in air | Resistance to thermal shocks |
|---|---|---|---|---|
| Alumina (94%-99.8%) | 7.5 to 9.5 | 18 to 30 | 1500 to 1700 | + |
| Alumina-zirconia composite | 8 | 25 | 1500 | ++ |
| Zirconia MgO & Y-TZP | 10 | 2 to 2.5 | 1000 to 2000 | ++ |
| Aluminum nitride | 5.5 | 140 to 180 | 800 | ++ |
| Sintered silicon carbide | 4 to 5 | 80 to 125 | 1400 to 1900 | +++ |
| Sintered silicon nitride | 3 to 4 | 20 to 25 | 1200 to 1500 | +++ |
| Quartz | 0.5 | 1.5 | 950 to 1150 | − |
| Vitroceramic | 13 | 1.5 | 800 | − |

Furthermore, in order to be able to control each heating plate 95, each clamping plate 45, 46 includes internal grooves 100, 101, for example produced in the form of piercings, in order to insert two thermocouple devices per plate 45, 46.

Precisely, as can be seen on FIG. 9, a first safety internal groove 100 and a second regulation internal groove 101 are formed in the top clamping plate 45, allowing respectively insertion of a first safety thermocouple device and of a second thermocouple device.

The first safety thermocouple device of the heating plate 95 is placed as close as possible to the zone to be controlled, namely as close as possible to the heating element in order to avoid overheating and damage thereof. The second regulation thermocouple device of the heating plate 95 is located in the zone of interest making it possible to obtain information on the transfer of heat to the stack 20.

It is important to note that expansion must also be taken into account but, as the clamping forces take place at the bores of the clamping plates, it is necessary to ensure that the plates do not curve since the heating plates, preferentially made from ceramic, would break.

In order to be able to make a finite-element calculation, a housing 90 of 86 mm×8 mm in the middle of the clamping plate has been selected. It is then a case of checking that, under a clamping force of 500 N per tie rod, the flexion of the clamping plate makes it possible to insert or remove the heating plate 95 when the stack 20 is under clamping. The calculation was done at 800° C. with 310S steel as the material of the clamping plate 45, 46.

It was then observed that a flexion of the order of one micron is obtained, which poses no particular problem for allowing mounting and demounting of the heating plate 95.

Naturally, the invention is not limited to the example embodiments that have just been described. Various modifications can be made thereto by a person skilled in the art.

What is claimed is:

1. An assembly, including:
   a stack of solid-oxide cells of the SOEC/SOFC type operating at high temperature, including:
      a plurality of electrochemical cells each formed by a cathode, an anode, and an electrolyte interposed between the cathode and the anode, and a plurality of intermediate interconnectors each arranged between two adjacent electrochemical cells,
   a system for clamping the stack of solid-oxide cells of the SOEC/SOFC type, including a top clamping plate and a bottom clamping plate, between which the stack of solid-oxide cells of the SOEC/SOFC type is clamped, each clamping plate including at least two clamping orifices, the clamping system further including:

at least two clamping rods intended to each extend through a clamping orifice of the top clamping plate and through a corresponding clamping orifice of the bottom clamping plate to enable the top and bottom clamping plates to be assembled together, clamping means at each clamping orifice of the top and bottom clamping plates intended to cooperate with said at least two clamping rods to enable the top and bottom clamping plates to be assembled together, wherein at least one of the top and bottom clamping plates includes a housing, formed in the thickness of said at least one of the top and bottom clamping plates, comprising first and second opposite ends, at least one of which emerges on the lateral face of said at least one of the top and bottom clamping plates, said housing being located inside said at least one of the top and bottom clamping plates, at a distance from its main top and bottom faces substantially parallel to each other, and wherein the assembly includes at least one heating plate, demountable and interchangeable, inserted in said housing.

2. The assembly according to claim 1, wherein said housing and said at least one heating plate have a substantially parallelepipedal shape, in particular a slab shape or a cubic shape.

3. The assembly according to claim 1, wherein said housing is formed, in the thickness of said at least one of the top and bottom clamping plates, centrally, at equal distances from the main top and bottom faces, and at equal distances from the clamping orifices, between the clamping orifices.

4. The assembly according to claim 1, wherein the thickness of said housing is between 5 mm and 10 mm, in particular of the order of 8 mm, and wherein the width of the housing is between 20 mm and 86 mm, in particular of the order of 86 mm.

5. The assembly according to claim 1, wherein said at least one heating plate includes a heating element the maximum power of which is at least 1200 W.

6. The assembly according to claim 1, wherein said at least one heating plate is produced from ceramic or from metal alloy, in particular from stainless steel or from nickel-based alloy, being in particular treated by an aluminizing coating.

7. The assembly according to claim 1, wherein a clearance is present between the external surface of said at least one heating plate and the internal surface of said housing, the dimension of which is between 0.2 and 0.5 mm.

8. The assembly according to claim 1, wherein said at least one of the top and bottom clamping plates includes at least one internal groove formed in the thickness of said at least one of the top and bottom clamping plates, and extending substantially parallel to the top and bottom-faces thereof, and at least one end of which emerges on the lateral face of said at least one of the top and bottom clamping plates, and wherein the assembly includes at least one thermocouple device inserted in said at least one internal groove.

9. The assembly according to claim 8, wherein said at least one internal groove includes a first safety internal groove and a second regulation internal groove and wherein said at least one thermocouple device includes a first safety thermocouple device inserted in the first internal groove and a second regulation thermocouple device inserted in the second internal groove.

10. The assembly according to claim 1, it includes-further including a top end plate and a bottom end plate, between which the plurality of electrochemical cells and the plurality of intermediate interconnectors are clamped.

11. The assembly according to claim 1, wherein said at least one of the top and bottom clamping plates is manufactured by an additive manufacturing technique, being in particular produced from refractory austenitic steel.

12. The assembly according to claim 1, said wherein at least one of the top and bottom clamping plates has a thickness of between 20 and 30 mm, in particular of the order of 25 mm.

13. A method for manufacturing the assembly according to claim 1, including the step of producing said housing in said at least one of the top and bottom clamping plates.

14. The according to claim 13, wherein the step of producing said housing includes production by electroerosion, by hubbing, and/or by additive manufacturing.

* * * * *